US009317375B1

(12) United States Patent
Sadhu et al.

(10) Patent No.: US 9,317,375 B1
(45) Date of Patent: Apr. 19, 2016

(54) MANAGING CACHE BACKUP AND RESTORE FOR CONTINUOUS DATA REPLICATION AND PROTECTION

(75) Inventors: Vamsikrishna Sadhu, Bangalore (IN); Brian R. Gruttadauria, Sutton, MA (US); Suresh Kumar Kalidindi, Bangalore (IN)

(73) Assignee: LENOVOEMC LIMITED, Quarry Bay (HK)

( * ) Notice: Subject to any disclaimer, the term of this patent is extended or adjusted under 35 U.S.C. 154(b) by 155 days.

(21) Appl. No.: 13/435,295

(22) Filed: Mar. 30, 2012

(51) Int. Cl.
*G06F 12/00* (2006.01)
*G06F 11/14* (2006.01)

(52) U.S. Cl.
CPC .................................. *G06F 11/1451* (2013.01)

(58) Field of Classification Search
CPC ............ G06F 12/0246; G06F 11/1451; G06F 11/1456
USPC ................................... 707/649; 711/162, 103
IPC ..................................................... G06F 12/0246
See application file for complete search history.

(56) References Cited

U.S. PATENT DOCUMENTS

| | | | | |
|---|---|---|---|---|
| 5,497,483 | A * | 3/1996 | Beardsley ........... | G06F 11/1466 711/100 |
| 7,103,796 | B1 * | 9/2006 | Kekre et al. .................. | 714/6.31 |
| 7,395,378 | B1 * | 7/2008 | Pendharkar et al. .......... | 711/144 |
| 7,574,461 | B1 * | 8/2009 | Armorer ............. | G06F 11/1458 |
| 7,657,796 | B1 * | 2/2010 | Kaiser ................ | G06F 11/1435 707/821 |
| 7,769,722 | B1 * | 8/2010 | Bergant et al. ................ | 707/681 |
| 7,818,299 | B1 * | 10/2010 | Federwisch et al. .......... | 707/649 |
| 7,992,038 | B1 | 8/2011 | Glade et al. | |
| 8,069,320 | B1 * | 11/2011 | Per et al. ....................... | 711/161 |
| 8,099,572 | B1 * | 1/2012 | Arora ....................... | G06F 13/28 707/640 |
| 8,127,307 | B1 | 2/2012 | Palekar et al. | |
| 8,321,642 | B1 * | 11/2012 | Anzai et al. .................... | 711/161 |
| 8,335,771 | B1 * | 12/2012 | Natanzon et al. ............. | 707/684 |
| 8,352,785 | B1 * | 1/2013 | Nicklin et al. .................. | 714/15 |
| 8,356,015 | B1 | 1/2013 | Suryanarayanan et al. | |
| 8,725,971 | B2 * | 5/2014 | Nakamura et al. ............. | 711/162 |
| 2008/0082770 | A1 * | 4/2008 | Ahal et al. ..................... | 711/162 |
| 2010/0005259 | A1 * | 1/2010 | Prahlad et al. ................ | 711/162 |
| 2010/0077165 | A1 * | 3/2010 | Lu ........................ | G06F 11/1451 711/162 |
| 2010/0153638 | A1 * | 6/2010 | Yochai ................ | G06F 11/1464 711/113 |
| 2010/0228919 | A1 * | 9/2010 | Stabrawa et al. ............. | 711/120 |
| 2011/0022566 | A1 * | 1/2011 | Beaverson et al. ........... | 707/639 |
| 2012/0016842 | A1 * | 1/2012 | Furuya .......................... | 707/649 |

(Continued)

OTHER PUBLICATIONS

Vamsikrishna Sadhu, Brian R. Gruttadauria, "Managing Incremental Cache Backup and Restore" file history of related pending U.S. Appl. No. 13/432,637, filed Mar. 28, 2012.
Vamsikrishna Sadhu, Brian R. Gruttadauria, "Managing Incremental Cache Backup and Restore" related U.S. Appl. No. 13/432,637, final office action dated Oct. 15, 2014.
Vamsikrishna Sadhu, Brian R. Gruttadauria, "Managing Incremental Cache Backup and Restore" related U.S. Appl. No. 13/432,637, applicants response to final office action filed Oct. 28, 2014.

(Continued)

*Primary Examiner* — Adam M Queler
*Assistant Examiner* — Trang Ta
(74) *Attorney, Agent, or Firm* — John L. Rogitz; John M. Rogitz

(57) ABSTRACT

A method is used for managing cache backup and restore for continuous data replication and protection. I/O operations are quiesced at a cache module. A first snapshot of a storage object and a second snapshot of an SSD cache object are taken. The I/O operations at the cache module are unquiesced. A single backup image comprising the first snapshot and the second snapshot is created. The single backup image is sent to a first data protection appliance (DPA) and recorded in a journal.

20 Claims, 11 Drawing Sheets

(56) References Cited

U.S. PATENT DOCUMENTS

| | | | |
|---|---|---|---|
| 2012/0101996 A1* | 4/2012 | Lim | G06F 17/30088 707/649 |
| 2012/0110287 A1* | 5/2012 | Han et al. | 711/162 |
| 2012/0179886 A1* | 7/2012 | Prahlad et al. | 711/162 |
| 2012/0210041 A1* | 8/2012 | Flynn et al. | 711/3 |
| 2012/0215970 A1* | 8/2012 | Shats | 711/103 |

OTHER PUBLICATIONS

Vamsikrishna Sadhu, Brian R. Gruttadauria, "Managing Incremental Cache Backup and Restore" related U.S. Appl. No. 13/432,637, non-final office action dated Jan. 7, 2015.

Vamsikrishna Sadhu, Brian R. Gruttadauria, "Managing Incremental Cache Backup and Restore" related U.S. Appl. No. 13/432,637, applicants response to non-final office action filed Jan. 8, 2015.

* cited by examiner

SSD CACHE CONFIGURED RAW STORAGE OBJECT

CACHE CONFIGURED STORAGE OBJECT BACKUP

CACHE CONFIGURED STORAGE OBJECT RESTORE

MANAGING CACHE BACKUP AND RESTORE FOR CONTINUOUS DATA REPLICATION AND PROTECTION

CROSS-REFERENCE TO RELATED APPLICATIONS

This application is related to U.S. patent application Ser. No. 13/342,008 entitled MANAGING CACHE BACKUP AND RESTORE, filed Dec. 31, 2011, which is incorporated herein by reference for all purposes, and U.S. patent application Ser. No. 13/432,637 entitled MANAGING INCREMENTAL CACHE BACKUP AND RESTORE, filed Mar. 28, 2012.

BACKGROUND

1. Technical Field

This application relates to managing cache backup and restore using continuous data replication and protection.

2. Description of Related Art

Computer data is vital to today's organizations, and a significant part of protection against disasters is focused on data protection. Storage technology advancements have decreased the cost of memory to the point where organizations can afford to operate storage systems that store and process petabytes of data.

Storage devices are employed to store data that is accessed by computer systems. Examples of basic storage devices include volatile and non-volatile memory, floppy drives, hard disk drives, tape drives, optical drives, etc. A storage device may be locally attached to an input/output (I/O) channel of a computer. For example, a hard disk drive may be connected to a computer's disk controller. A storage device may also be accessible over a network. Examples of such a storage device include network attached storage (NAS) and storage area network (SAN) devices. A storage device may be a single stand-alone component or be comprised of a system of storage devices such as in the case of Redundant Array of Inexpensive Disks (RAID) groups.

Advances in semiconductor technology have lead to an increase in the use of a semiconductor solid state drive (also known as a solid state disk or SSD) which uses a flash memory as a storage device, in areas such as computer systems. Thus, in at least some cases there seems to be a trend towards the use of an SSD as a storage device instead of a magnetic disk. In spite of having features such as, for example, a relatively small storage capacity and a relatively high price, the SSD has some other features that can make it more attractive as a storage device than the conventional magnetic disk in at least some cases.

Features that can make SSDs preferable as storage devices are, for example, a fast access rate, high throughput, a high integration density, and stability against an external impact. SSDs can move much larger amounts of data and process far more I/O requests, per time period, than conventional magnetic disks. This allows users to complete data transactions much more quickly. Furthermore, advances in manufacturing technologies for SSDs may reduce the production costs of SSDs and also increase the storage capacities of SSDs. These developments may provide further incentive to use SSDs in place of magnetic disks in at least some cases. Storage systems often utilize the services of high performance storage devices as cache to store more frequently accessed data. These caches can include dedicated non-volatile SSD memory. In this context, caching is a technique to speed up data requests from application programs by saving frequently accessed data in memory for quick recall by the file system without having to physically retrieve the data from the storage devices. Caching is also useful during file writes; the file system may write data to the memory cache and return control to the application before the data is actually written to non-volatile storage. Eventually, the cached data is written to the storage devices.

The state of the cache depends upon the consistency between the cache and the storage devices. A cache is "clean" when its contents are exactly the same as the data stored on the underlying storage devices. A cache is "dirty" when its data is newer than the data stored on storage devices; a cache becomes dirty when the file system has written to the cache, but the data has not yet been written to the storage devices. A cache is "stale" when its contents are older than data stored on the storage devices; a cache becomes stale when it has not been updated to reflect changes to the data stored on the storage devices.

In order to maintain consistency between the caches and the storage devices, file systems perform "flush" and "invalidate" operations on cached data. A flush operation writes dirty cached data to the storage devices before returning control to the caller. An invalidation operation removes stale data from the cache without invoking calls to the storage devices. File systems may flush or invalidate caches for specific byte-ranges of the cached files.

Protecting data is a major concern to virtually every organization. Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, file system level, or data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

SUMMARY OF THE INVENTION

A method is used for managing cache backup and restore using continuous data replication and protection. I/O operations are quiesced at a cache module. A first snapshot of a storage object and a second snapshot of an SSD cache object are taken. The I/O operations at the cache module are unquiesced. A single backup image comprising the first snapshot and the second snapshot is created. The single backup image is sent to a first data protection appliance (DPA) and recorded in a journal.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION OF EMBODIMENT(S)

Figure 1:
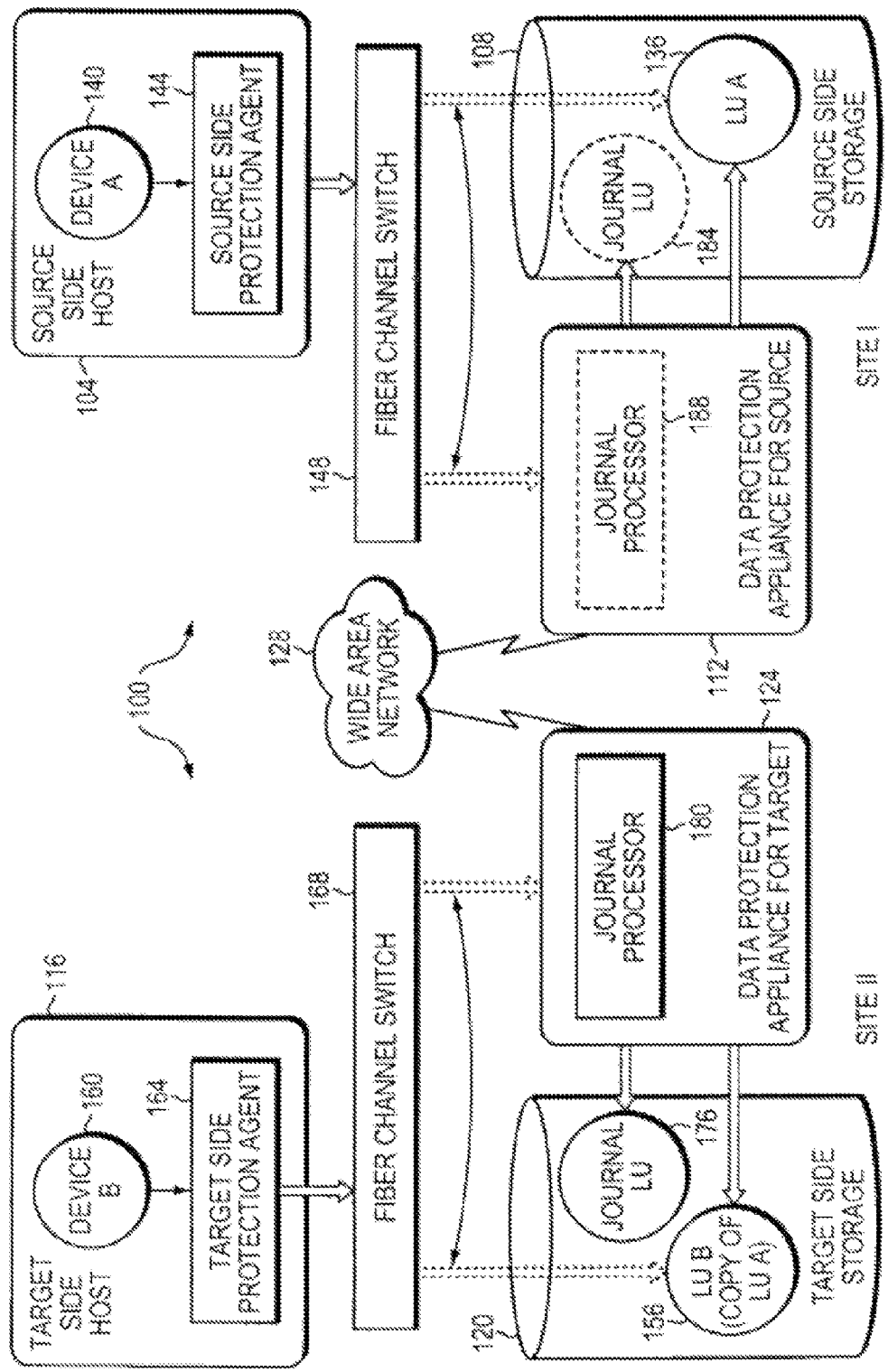
FIG. 1 is a simplified illustration of a data protection system, in accordance with an embodiment of the present invention.

Solid state drives have become a cost effective, power saving, performance solution for consumers and businesses, but can trail traditional hard drives in terms of cost of capacity. Having a flash cache feature in data storage device allows users to combine a single SSD with a traditional RAID configuration thereby realizing the performance benefits of the SSD without the added cost of moving to an entirely SSD based solution. SSD can be used, for example, as an SSD cache in a storage system and configured to store frequently accessed data. Less frequently accessed data may be stored on slower, less expensive storage such as hard disk drives (HDD). Such a configuration provides to a user the performance of an SSD based storage system with the cost and capacity of a HDD based system.

Protecting data stored on such systems has become critically important to users. Data protection systems typically include some form of replicating, backing up, and restoring data. However, with conventional systems, only non-cache data is backed up and, consequently, only non-cache data gets restored. That is, data stored in cache, such as an SSD cache, is not backed up. Thus, when data is restored, the cache is essentially empty and must begin storing data. As a result, the performance benefit of the previously populated SSD cache is lost when data is restored. By contrast, current techniques enable an SSD cache to be backed up and restored, thus preserving the cache performance benefit.

The following may be helpful in understanding the specification and claims:

BACKUP SITE—a facility where replicated production site data is stored; the backup site may be located in a remote site or at the same location as the production site;

BLOCK VIRTUALIZATION—may be a layer which take back end storage volumes and, by slicing, concatenating and striping, creates a new set of volumes that serve as base volumes or devices in the virtualization layer;

CLONE—a clone may be a copy or clone of the image or images, drive or drives of a first location at a second location;

CONTINUOUS DATA PROTECTION (CDP)—may refer to a full replica of a volume or a set of volumes along with a journal which allows any point in time access, the CDP copy is at the same site, and may be in the same storage array as the production volume; CONTINUOUS REMOTE REPLICATION (CRR)—may refer to a full replica of a volume or a set of volumes along with a journal which allows any point in time access at a site remote to the production volume and on a separate storage array;

DATA PROTECTION APPLIANCE (DPA)—a computer or a cluster of computers that serve as a data protection appliance, responsible for data protection services including inter alia data replication of a storage system, and journaling of I/O requests issued by a host computer to the storage system;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical;

DISTRIBUTED MIRROR—may be a mirror of a volume across a distance, either metro- or geo-, which is accessible at all sites;

FAIL ALL MODE—may be a mode of a volume in the splitter where all write and read I/Os intercepted by the splitter are failed to the host, but other SCSI command, like read capacity, are served;

GLOBAL FAIL ALL MODE—may be a mode of a volume in the virtual layer where all write and read I/Os to the virtual layer are failed to the host, but other SCSI commands, like read capacity, are served;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGGED ACCESS—may be an access method provided by the appliance and the splitter in which the appliance rolls the volumes of the consistency group to the point in time the user requested and let the host access the volumes in a copy on first write base;

LOGICAL UNIT—a logical entity provided by a storage system for accessing data from the storage system;

LUN—a logical unit number for identifying a logical unit;

MARKING ON SPLITTER—may be a mode in a splitter where intercepted I/Os are not split to an appliance and the storage, but rather changes (meta data) are tracked in a list and/or a bitmap and I/Os are sent immediately down the I/O stack;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

REPLICATION PROTECTION APPLIANCE (RPA)—another name for DPA;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period;

SPLITTER/PROTECTION AGENT: may be an agent running either on a production host a switch or a storage array which can intercept I/O and split them to a DPA and to the storage array, fail I/O redirect I/O or do any other manipulation to the I/O; the splitter or protection agent may be used in both physical and virtual systems. The splitter may be in the I/O stack of a system and may be located in the hypervisor for virtual machines.

STORAGE MEDIUM—may refer to one or more storage mediums such as a hard drive, a combination of hard drives, flash storage, combinations of flash storage, combinations of hard drives, flash, and other storage devices, and other types and combinations of computer readable storage mediums including those yet to be conceived; a storage medium may also refer both physical and logical storage mediums and may include multiple level of virtual to physical mappings and may be or include an image or disk image;

STORAGE SYSTEM—a SAN entity that provides multiple logical units for access by multiple SAN initiators;

TARGET—a node in a SAN that replies to I/O requests;

TARGET SIDE—a receiver of data within a data replication workflow; during normal operation a back site is the target side, and during data recovery a production site is the target side;

VIRTUAL ACCESS—may be an access method provided by the appliance and the splitter in which the appliance exposes a virtual volume from a specific point in time to the host, the data for the virtual volume is partially stored on the remote copy and partially stored on the journal;

VIRTUAL VOLUME—may be a volume which is exposed to a host by a virtualization layer and may span across more than one site; and WAN—a wide area network that connects local networks and enables them to communicate with one another, such as the Internet.

A discussion of journaling and some techniques associated with journaling may be found in U.S. Pat. No. 7,516,287, entitled "METHODS AND APPARATUS FOR OPTIMAL JOURNALING FOR CONTINUOUS DATA REPLICATION," issued on Apr. 7, 2009 and assigned to EMC Corporation of Hopkinton, Mass., which is hereby incorporated by reference in its entirety.

A discussion of image access may be found in U.S. patent application Ser. No. 12/969,903 entitled "DYNAMIC LUN RESIZING IN A REPLICATION ENVIRONMENT" filed on Dec. 16, 2010 and assigned to EMC Corp., which is hereby incorporated by reference in its entirety.

A discussion of journal based replication may be integrated with a virtual service layer. may be found in U.S. patent application Ser. Nos. 13/077,256, 13/077,262, and 13/077,266, entitled "CONSISTENT REPLICATION IN A GEOGRAPHICALLY DISPERSE ACTIVE ENVIRONMENT," "INVERSE STAR REPLICATION," and "NETWORKED BASED REPLICATION OF DISTRIBUTED VOLUMES," respectively, filed on Mar. 31, 2011 and assigned to EMC Corp., which are hereby incorporated by reference in its entirety.

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier point in time, which may be used in the event of data corruption, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes four major components coupled via a storage area network (SAN); namely, (i) a storage system, (ii) a host computer, (iii) a data protection appliance (DPA), and (iv) a secondary storage system connected to storage array via SAN/NAS/DAS. Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links. In one example, the primary and secondary storage systems may be connected via a transport connection.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators. In addition, or alternatively, the source storage systems 108 and/or target storage system 120 may also include one or more virtual LUN(s) (not shown), for example, CDP LUNs.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. It should be noted that the protection agents may be located at different locations and, as such, may be host based (e.g., application host), fabric based (e.g., fibre channel switch), storage array based, or VM based (e.g., hypervisor).

Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.

Redirect the SCSI command to another logical unit.

Split the SCSI command by sending it first to the respective DPA. After the DPA returns an acknowledgement, send the SCSI command to its intended logical unit.

Fail a SCSI command by returning an error return code.

Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal. In addition, or alternatively, the target storage system 120 may also include one or more virtual LUN(s) (e.g., CDP LUNs) of LU A 136.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
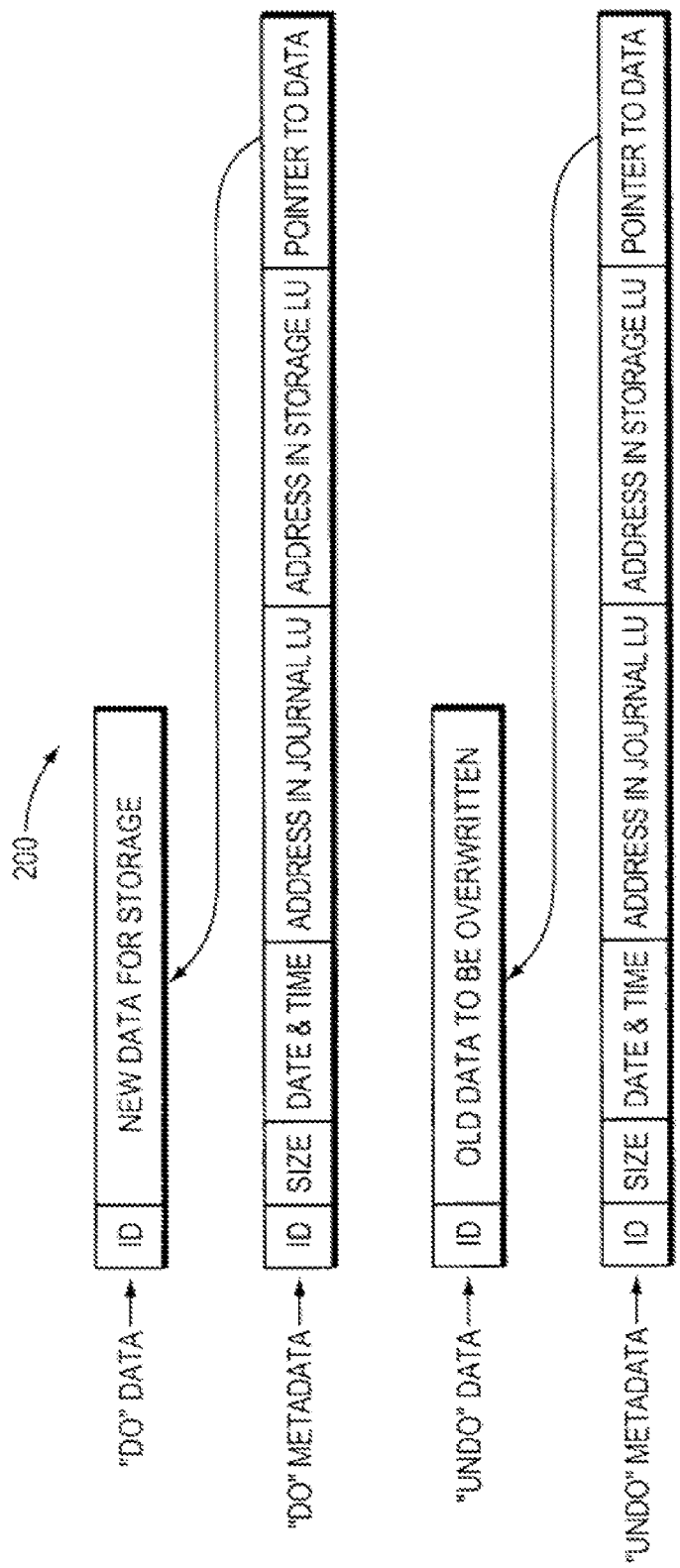
FIG. 2 is a simplified illustration of a write transaction for a journal, in accordance with an embodiment of the present invention.

FIG. 2 is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream. The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

A description of Image access follows. Herein, some information is provided for conventional continuous data protection systems having journaling and a replication splitter which may be used in one or more embodiments is provided. A replication set may refer to an association created between the source volume and the local and/or remote target volumes, and a consistency group contains one or more replication sets. A snapshot may be the difference between one consistent image of stored data and the next. The exact time for closing the snapshot may determined dynamically depending on replication policies and the journal of the consistency group.

In synchronous replication, each write may be a snapshot. When the snapshot is distributed to a replica, it may be stored in the journal volume, so that is it possible to revert to previous images by using the stored snapshots. As noted above, a splitter mirrors may write from an application server to LUNs being protected by the data protection appliance. When a write is requested from the application server it may be split and sent to the appliance using a host splitter/driver (residing in the I/O stack, below any file system and volume manager, and just above any multipath driver (such as EMC POWER-PATH®), through an intelligent fabric switch, through array-based splitter, such as EMC CLARiiON®.

There may be a number of image access modes. Image access may be used to restore production from the disaster recovery site, and to roll back to a previous state of the data. Image access may be also to temporarily operate systems from a replicated copy while maintenance work is carried out on the production site and to fail over to the replica. When image access is enabled, host applications at the copy site may be able to access the replica.

In virtual access, the system may create the image selected in a separate virtual LUN within the data protection appliance. While performance may be constrained by the appliance, access to the point-in-time image may be nearly instantaneous. The image may be used in the same way as logged access (physical), noting that data changes are temporary and stored in the local journal. Generally, this type of image access is chosen because the user may not be sure which image, or point in time is needed. The user may access several images to conduct forensics and determine which replica is required. Note that in known systems, one cannot recover the production site from a virtual image since the virtual image is temporary. Generally, when analysis on the virtual image is completed, the choice is made to disable image access.

If it is determined the image should be maintained, then access may be changed to logged access using 'roll to image.' When disable image access is disabled, the virtual LUN and all writes to it may be discarded.

In an embodiment of virtual access with roll image in background, the system first creates the image in a virtual volume managed by the data protection appliance to provide rapid access to the image, the same as in virtual access. Simultaneously in background, the system may roll to the physical image. Once the system has completed this action, the virtual volume may be discarded, and the physical volume may take its place. At this point, the system continues to function as if logged image access was initially selected. The switch from virtual to physical may be transparent to the servers and applications and the user may not see any difference in access. Once this occurs, changes may be read from the physical volume instead of being performed by the appliance. If image access is disabled, the writes to the volume while image access was enabled may be rolled back (undone). Then distribution to storage may continue from the accessed image forward.

In some embodiments in physical logged access, the system rolls backward (or forward) to the selected snapshot (point in time). There may be a delay while the successive snapshots are applied to the replica image to create the selected image. The length of delay may depend on how far the selected snapshot is from the snapshot currently being distributed to storage. Once the access is enabled, hosts may read data directly from the volume and writes may be handled through the DPA. The host may read the undo data of the write and the appliance may store the undo data in a logged access journal. During logged access the distribution of snapshots from the journal to storage may be paused. When image access is disabled, writes to the volume while image access was enabled (tracked in the logged access journal) may be rolled back (undone). Then distribution to storage may continue from the accessed snapshot forward.

Disable image access may mean changes to the replica may be discarded or thrown away. It may not matter what type of access was initiated, that is, logged or another type, or whether the image chosen was the latest or an image back in time. Disable image access effectively says the work done at the disaster recovery site is no longer needed.

A description of delta marking follows. A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

Figure 3:
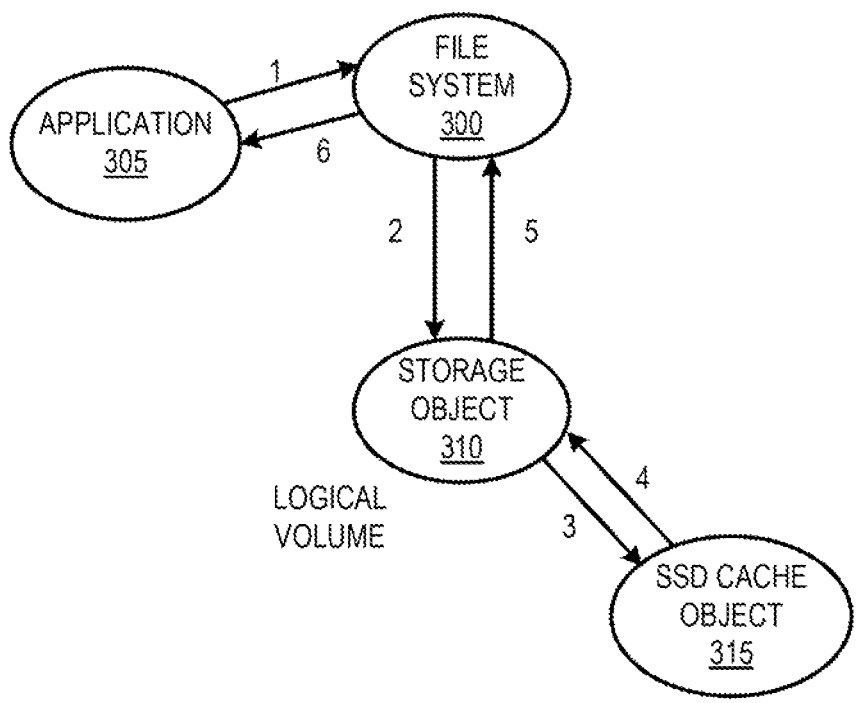
FIG. 3 is a state diagram illustrating an I/O state machine of an SSD cache configured file system storage object.

FIG. 3 depicts a state diagram illustrating I/O flow in a state machine for an SSD cache configured file system storage object. I/Os flow between a file system 300, application 305, storage object 310, and SSD cache object 315 according to the numbered steps. FIG. 3 also illustrates the layout of the file system 300 and the objects 310 and 315 with respect to each other. In this configuration, the storage object 310 is a logical volume that is created and mounted on top of the SSD cache object 315. The file system 300 is mounted on the storage object 310 and the file system 300 communicates directly with the application 305 and the storage object 310.

In step 1, I/O operations flow from the application 305 to the file system 300. In step 2, the I/O operation may flow from the file system 300 to the storage object 310. In step 3, I/O operation may flow from the storage object 310 to the SSD cache object 315. In step 4, the I/O operation flows from the SSD cache object 315 back storage object 310. In step 5, the I/O operation flows from the storage object 310 back to the file system 300. From there, in step 6, the I/O operation is transmitted from the file system 300 back to the application 305 and processed accordingly. It should be noted that although the example employs a file system 300, and therefore supports files, this should not be construed as a limitation. Other known data protocols are supported such as, for example, blocks.

Figure 4:
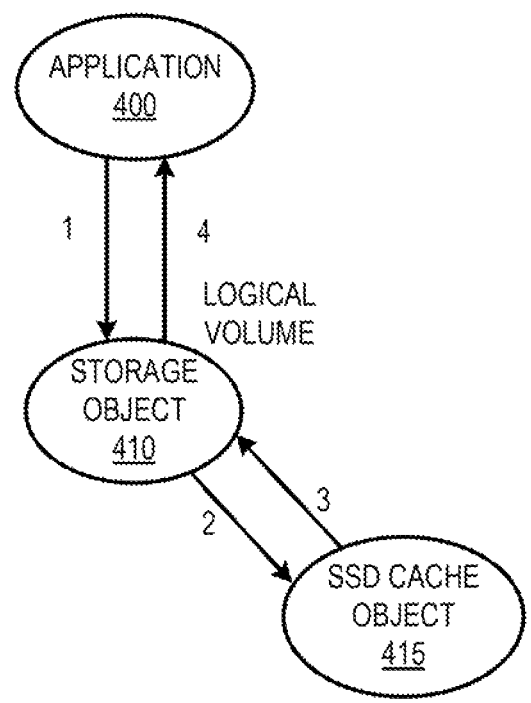
FIG. 4 is a state diagram illustrating an example embodiment of an I/O state machine of an SSD cache configured raw storage object.

FIG. 4 illustrates an example embodiment of an I/O state machine for an SSD cache configured raw storage object implemented according to techniques described herein. The storage object 410 may be represented as a logical volume that can be implemented in software executed by the storage processing circuitry 35. The SSD cache object 415 may be a logical volume built using flash based cache 32. In this configuration, the SSD cache object 415 communicates directly with the storage object 410.

I/O operations flow between the application 400 and objects 410 and 415 as shown in the numbered steps. For example, in step 1, I/O operations received from hosts 14a-n at (or generated by) an application 400 flow from the application 400 to the raw storage object 410. In step 2, I/O operations may flow from the raw storage object 410 to the SSD cache object 415. In step 3, I/O operations flow from the SSD cache object 415 back to the storage object 410 via, for example, an I/O callback. In step 4, an I/O operation (e.g., buffer) is returned to the application 400.

Figure 5:
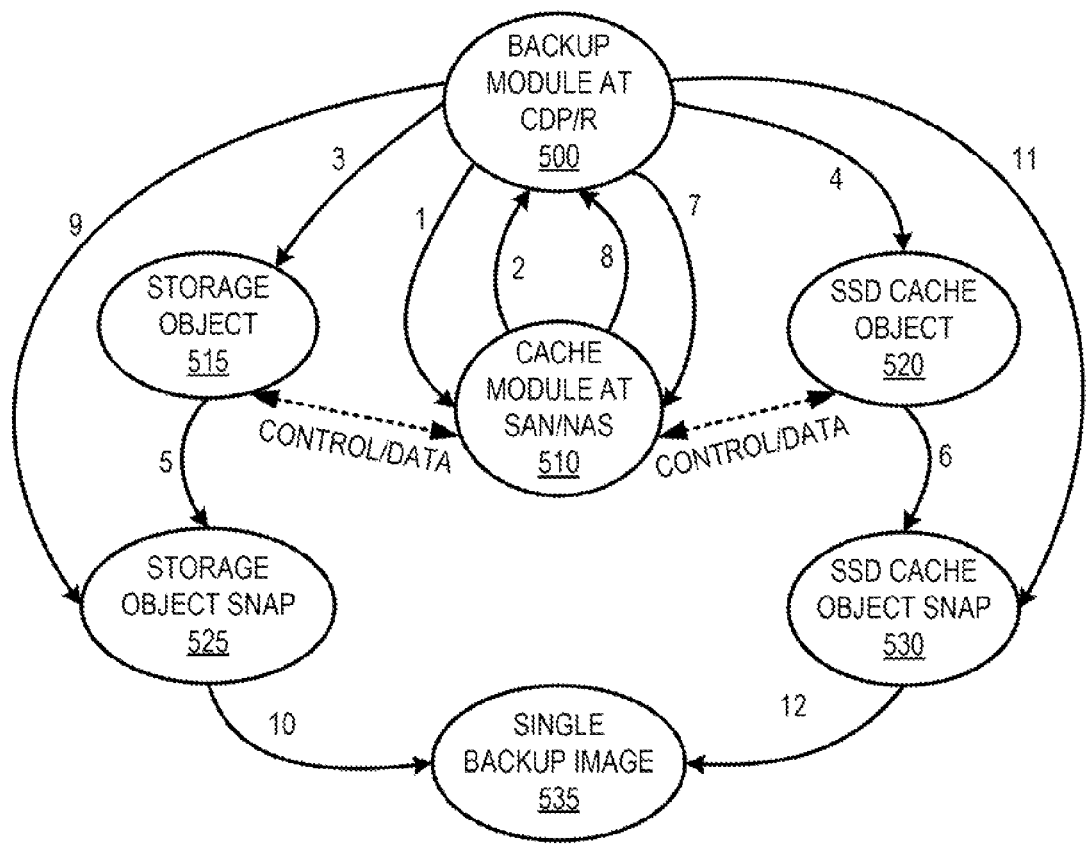
FIG. 5 is a block diagram illustrating an example embodiment of a backup module that may utilize the techniques described herein.

FIG. 5 depicts an example embodiment of a backup module that may utilize the techniques described herein. I/O flow is shown for backup of a cache configured storage object and proceeds according to the numbered steps. In this example, the backup module (located at the CDP/R appliance) 500 in conjunction with the cache module (located at the SAN/NAS) 510 generate snap backups for the storage object 515 and the SSD cache object 520. The storage object 515 and SSD cache object 520 are then merged into a single backup image 535. Although snapshot technology is used to illustrate the techniques described herein, other known backup technology may be similarly utilized. Further, although the techniques describe a single backup image 535, alternative example embodiments may use multiple backup images.

The techniques described herein advantageously enable communication between the backup module 500 and the cache module 510. Accordingly, in step 1, the backup module 500 may issue a request to freeze or quiesce I/O operations (e.g., I/O communications) to the cache module 510. Freezing or quiescing I/O operations may be performed to prepare the storage system for creating a consistent backup state. For example, updates are not allowed to an object but reads are allowed. In some embodiments, quiescing may be associated with performing one or more operations to ensure object consistency. In some embodiments quiescing a storage object includes performing one or more following: flushing one or more buffers associated with the object, disabling updates to the object, and logging transactions associated with the object. In various embodiments, the type of operations associated with performing quiescing is configurable. For example, configuration parameters may be included with the request to specify the type of operations and/or configuration associated with the operations performed during quiescing. Quiescing I/O operations associated with applications running on a host may be coordinated by the host.

In step 2, a response is sent from the cache module 510 back to the backup module 500. In step 3, a snapshot request is generated and forwarded to the storage object 515. Similarly, in step 4, another snapshot request is generated and forwarded to the SSD cache object 520. In step 5, based on the received request, a snapshot image of the storage object is created. In step 6, based on the received request, a snapshot image of the SSD cache object is created. In step 7, I/O operations are resumed (i.e., unfrozen or unquiesced). In some embodiments, unquiescing a component includes performing one or more of the following: re-enabling updates, ending hot backup transaction logging, and implementing changes requested to the object while quiesced. In step 8, a response is sent from the cache module 510 to the backup module 500. In step 9, a backup request is forwarded from the backup module 500 to the storage object snap 525. In various embodiments, the type of backup method used is configurable and/or specified by configuration preference included with the request. In some embodiments, backup is initiated within a prescribed or indicated amount of time from unquiescing I/O operations.

A complete backup of the storage object snap may be forwarded to the single backup image 535 in step 10. In step 11, a backup request is forwarded from the backup module 500 to the SSD cache object snap. In step 12, a backup of SSD cache dirty block and metadata dump of clean block is performed. Thus, a single backup image of both the storage object snap 525 and the SSD cache object snap 530 may be created. The control module 510 may communicate with the storage object 515 and/or the SSD cache object 520 via control/data signals which communications are represented via the dotted communication paths.

Figure 6:
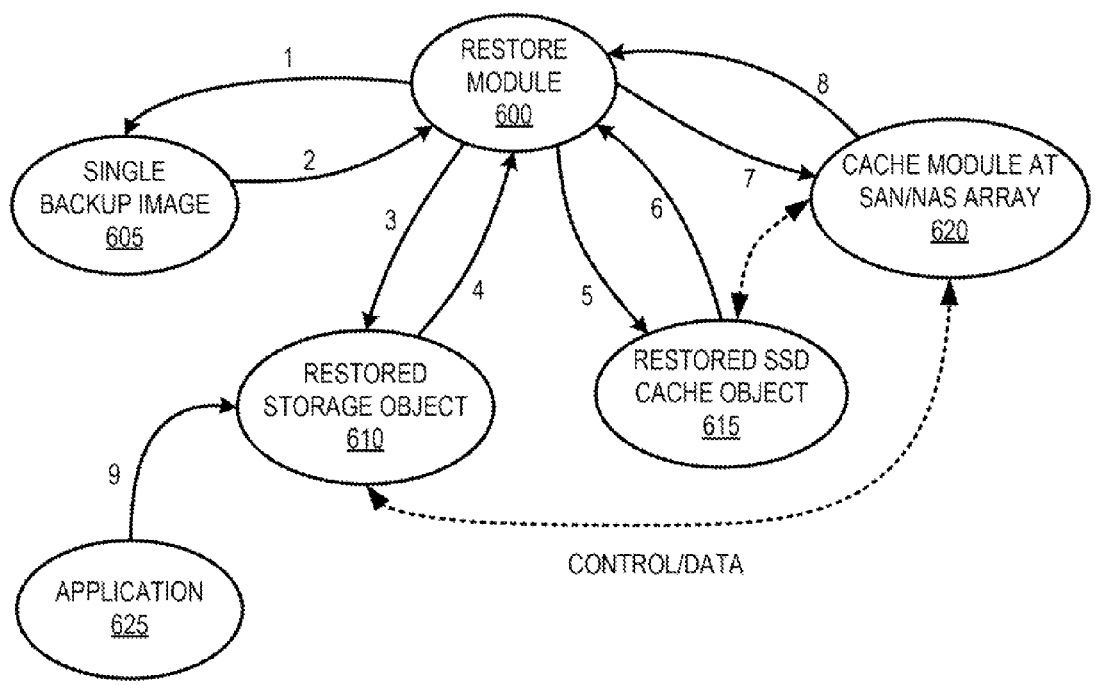
FIG. 6 is a block diagram illustrating an example embodiment of a restore module that may utilize the techniques described herein.

FIG. 6 is a block diagram illustrating an example embodiment of a restore module that may utilize the techniques described herein. The restore module may be used in conjunction with the backup module described above to provide a data recovery solution that advantageously provides cache performance benefit when storage is restored to a point in time backup. This example depicts restoring a cache configured storage object from a single backup image wherein I/O communication proceeds according to the indicated sequence. In this example, the restore module 600 makes use of the single backup image 605 to restore a storage object 610 and an SSD cache object 615 based on a previously generated snaps.

In operation, at step 1, a restore operation is initiated. At step 2, the restore module 600 reads restore data from the single backup image 605. At step 3, the storage object 610 is restored using the storage object portion of the single backup image 605 and at step 4, a storage object restore status is forwarded to the restore module 600. At step 5, the SSD cache object 615 is restored using the SSD cache object portion of the single backup image 605 using a cache mapping technique described below with reference to FIG. 8. At step 6, an SSD cache object restore status is forwarded to the restore module 600. At step 7, cache mapping between restored SSD cache object 615 and restored storage object 610 is enabled. Upon completion, a restore status value is forwarded to the restore module 600, and at step 9, the application is granted access to the restored storage object 610. Control and/or data signals may be communicated between the cache module (located at a SAN/NAS array) 620 and the restored storage object 610 as shown via the dotted communication paths. Thus, the restored cache configured storage is exposed to application 625 thereby resulting in an immediate SSD cache I/O performance benefit. By contrast, conventional systems do not have a cache module that communicates with a backup module and restore module in the manner described herein. Consequently, when conventional systems restore a backup, because the cache was not restored, the cache must be rebuilt anew and as a result, suffers performance degradation.

In an example embodiment, the SSD cache backup and restore techniques described herein may be integrated with the CDP/R system described above as follows. A storage array (e.g., NAS/SAN) where the storage object and SSD cache object reside may be integrated with the CDP/R system to provide a point in time SSD cache benefit associated with a restored storage object. Storage volumes at the source side and the target side may be assigned to a consistency group to define CDP/R rules for the data set. The SSD cache object (i.e., SSD LUN on DAS/SAN storage array) configured to a storage object (i.e. production LUN) may be added to consistency group along with its corresponding storage object (i.e., production LUN). As a result, all writes to the SSD cache will also be protected by the CDP/R appliance.

CDP/R Solution Management Interface, I/O Splitter, Other Agents, CDP/R Appliance can be configured to detect the SSD cache configured production LUNS. In one implementation, code changes may be made to system software so as to add the SSD Cache to a consistency group to provide protection/replication of SSD I/O using the CDP/R appliance.

The CDP/R system may use SSD or inexpensive hard disk drives to maintain time store volumes (i.e. virtual LUN's) for every SSD cache configured to each production LUN. The implementation choice regarding SSD and less expensive HDDs is based on cost vs. I/O performance. Based on these choices, the CDP/R system can implement the appropriate storage devices for time store volumes.

Device discovery agents running on the storage array/host may be able to detect SSD cache devices configured to a production LUN used by an application. In this case, the properties of the device such as size, type of device (e.g., SSD cache) and required parameters are sent to management software at the CDP/Appliance along with production LUN information. Thus, when system administrator configures protection to an application that uses SSD cache configured LUN, a consistency group to protect the SSD cache of a production LUN will be created and the same information will be populated to all required components participating in the protection scheme.

The snapshot process described below may be taken by the CDP/R appliance as well as any point in time snapshot of the cache configured volume. The CDP/R appliance can communicate system with all necessary components to create point in time snapshots of a cache configured LUN (i.e. production LUN and SSD Cache).

Snapshot request to an SSD cache configured LUN at the CDP/R appliance can be made at the consistency group level and this ensures creation of individual snapshots of storage objects (i.e. production LUN) and the SSD cache object. The cache module can reside at the application server, fabric switch, or storage array.

Integration of the SSD cache backup/restore techniques may modify consistency group fields to include the following:
  One or more productions LUNs and an SSD Cache LUN
  Virtual LUNs (created by the CDP/R appliance based on the number of production LUNs and the SSD cache LUN; same would be exported by CDP/R appliance's target mode driver to the application server over a SAN) Configuration state The backup module at the CDP/R as described above with reference to FIG. 5 may communicate with the backup application accordingly to create a point in time backup image of a cache configured production volume for an application. The CDP/R also helps the backup application create a single backup image of production LUN and SSD cache on a secondary storage. The backup module may also communicate with necessary components in the CDP/R appliance to take a consistent snapshot of a cache configured volume (i.e., snapshot of production LUN and SSD Cache LUN). The single backup image available at the first or second data protection appliance can be moved to a secondary storage system with the help of backup module at the data protection appliance. Alternatively, CDP/R policies can be set to "backup application secondary storage" at the first data protection appliance so that the single backup image would be protected by the CDP/R system, hence double protection of storage object and SSD cache is achieved.

Various embodiments utilizing techniques described herein may employ a cache algorithm such as that described in the following example. The algorithm may configure an SSD cache object of a size X to a storage object of size Y with block size B. Upon successful cache configuration, a superblock having the following format may be maintained in the data storage system 12 memory and stored persistently at SSD Cache Object Sector Z. An example on disk superblock format may include the following:

1. State of superblock.
2. Cache Object Size (X)
3. Storage Object Size (Y)
4. Cache Object label
5. Storage Object label
6. Cache block size (B)
7. Cache DRL The cache dirty region logging (DRL) may be an on disk structure comprising a set of cache block entries where each entry contains cached block information, state information (i.e., dirty or clean), and DRL entry size. Block mapping between an SSD cache object and storage object may be performed using known hash based algorithms so that the storage object block data will be cached in a corresponding SSD cache block. An example cache mapping table of an SSD cache and storage object is shown below.

Cache Mapping Table Example:

| Seq. No. | Storage Object Logical Block Number | SSD Cache Logical Block Number |
| --- | --- | --- |
| 1 | 10 | 1 |
| 2 | 25 | 2 |
| 3 | 50 | 3 |
| 4 | 51 | 4 |
| 5 | 60 | 5 |

The above table may be build using a linear probing algorithm and hash formula, such as for example, ((Storage Object LBA) % (Total Number of SSD Cache Blocks)+1). A cache search module can be implemented using hashing and/or various dynamic data structures. The cache search module maintains the locality of reference information of the cached data blocks.

As mentioned above, cache (e.g., SSD cache) is commonly used in conventional data storage systems to store frequently accessed data on higher performance storage. When a system is first initialized, cache is essentially empty but as data is read, the storage system begins placing the frequently accessed data in the SSD cache. As the cache fills up, system performance improves because the amount of data available in the SSD increases.

However, in conventional systems, when a backup is performed, the performance advantage of cache is lost in that conventional methods do not backup the cache configured data. Consequently, when a restore is performed, SSD cache is essentially empty and the storage system must rebuild the cache. The rebuild process takes time and, as a result, the storage system will not be able to take full advantage of the performance benefit that the SSD cache can provide. This performance lag correspondingly increases as the size of cache increases because it takes longer to fill such large caches.

By contrast, techniques described herein provide a method, system, and computer program to backup both standard storage objects and an SSD cache object. Advantageously, when a restore is performed, the SSD cache is loaded with the data that was present when the backup was performed. Consequently, the performance lag is essentially eliminated thereby providing a significant performance boost when restoring data as compared with conventional methods. Integration of the current techniques with a CPD/R appliance, such as that described in FIG. 1 provides an additional advantage of storing cache data on less expensive storage (e.g., HDD). Furthermore, because the I/O protection is off-hosted to the CPD/R appliance, the production host application I/O performance is not degraded during this process. The techniques described below illustrate both full and incremental SSD cache backup and restore. Alternative example embodiments further illustrate techniques to reduce the amount of storage space required to perform a full or incremental backup.

Figure 7:
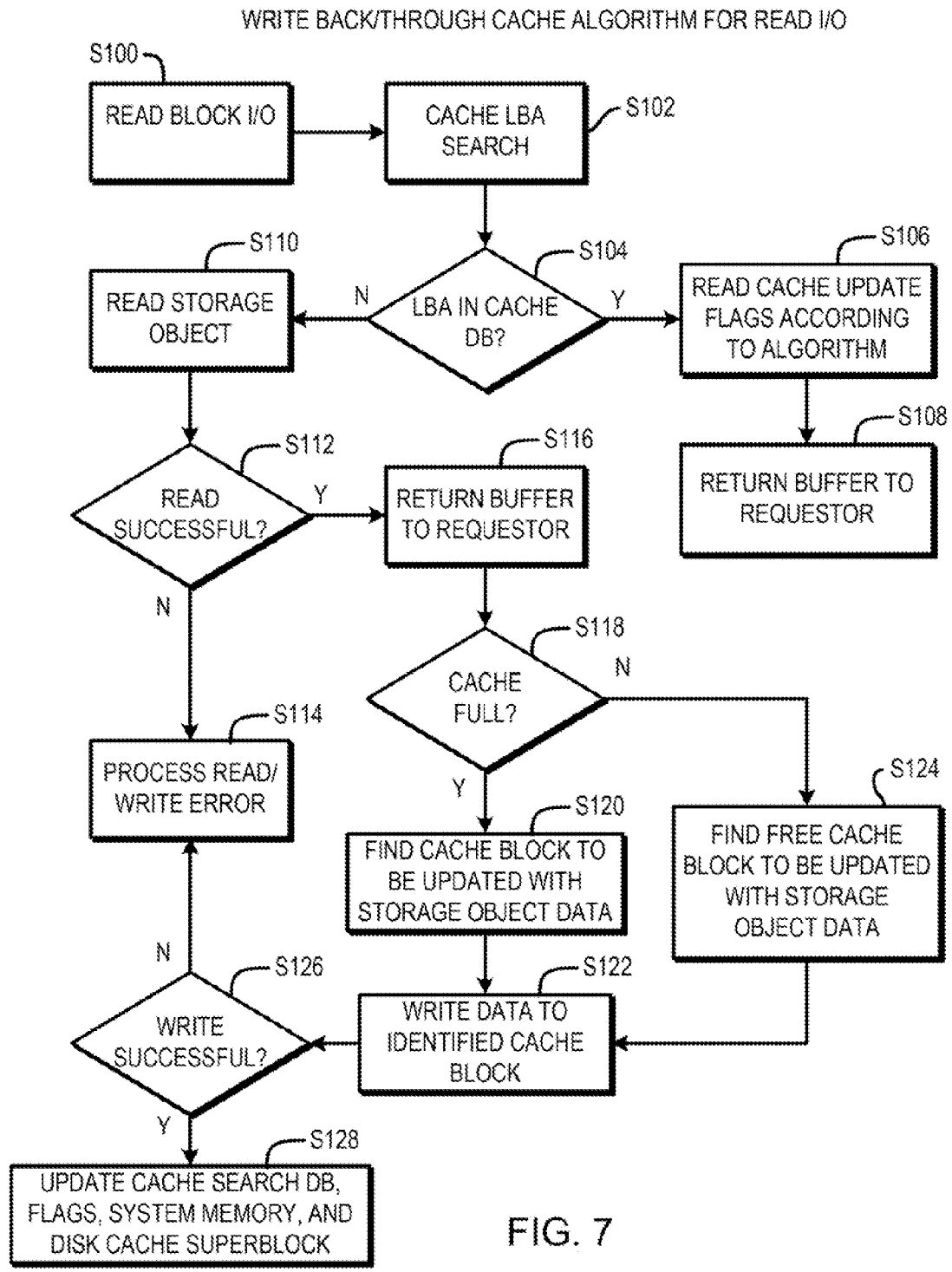
FIG. 7 is a flow diagram illustrating an example embodiment of a cache read algorithm that may utilize the techniques described herein.

FIG. 7 is a flow diagram illustrating an example method of a cache read algorithm that may utilize the techniques described herein. While various methods disclosed herein are shown in relation to a flowchart or flowcharts, it should be noted that any ordering of method steps implied by such flowcharts or the description thereof is not to be construed as limiting the method to performing the steps, or sub-steps within or among the steps, in that order. Rather, the various steps of each of the methods disclosed herein can be performed in any of a variety of sequences. In addition, as the illustrated flowcharts are merely example embodiments, various other methods that include additional steps or include fewer steps than illustrated are also within the scope of the present invention.

The method begins at step S100 by reading I/O for a block. At Step S102, a cache logical block address (LBA) search is executed. If, at step S104, the LBA is found in the cache database, the method proceeds to step S106 where the method reads from cache and then updates flags for the block according to the cache replacement algorithm, and then proceeds to step S108 where a buffer is returned to the requestor. However, if the LBA is not found at step S104, the method proceeds to step S110 and reads the storage object. At step 112, a determination is made as to whether the storage object read was successful or not. If the read was not successful, the method proceeds to step S114, where the read error is processed. If the read was successful, the method proceeds to step S116 where the buffer is returned to the requestor. At step S118, a determination is made to see if the cache is full, and if not, at step S124, the method finds a free cache block to be updated with the storage object. However, if, at step S118, the cache is determined to be full, the method proceeds to step S120 where, based on the cache replenish mechanism, the method locates the cache block to be updated with storage object data. In either case, the method proceeds to step S122 where data is written to the identified cache block. At step S126, a determination is made as to whether the write was successful or not. If the read was successful, the method proceeds to step S128 where various updates are performed including updating the cache search database with the new block, updating flags, and updating system memory and on disk cache superblock with the block information as clean. However, if at step S126 the write was not successful, the method proceeds to step S114 where the write error is processed.

Figure 8:
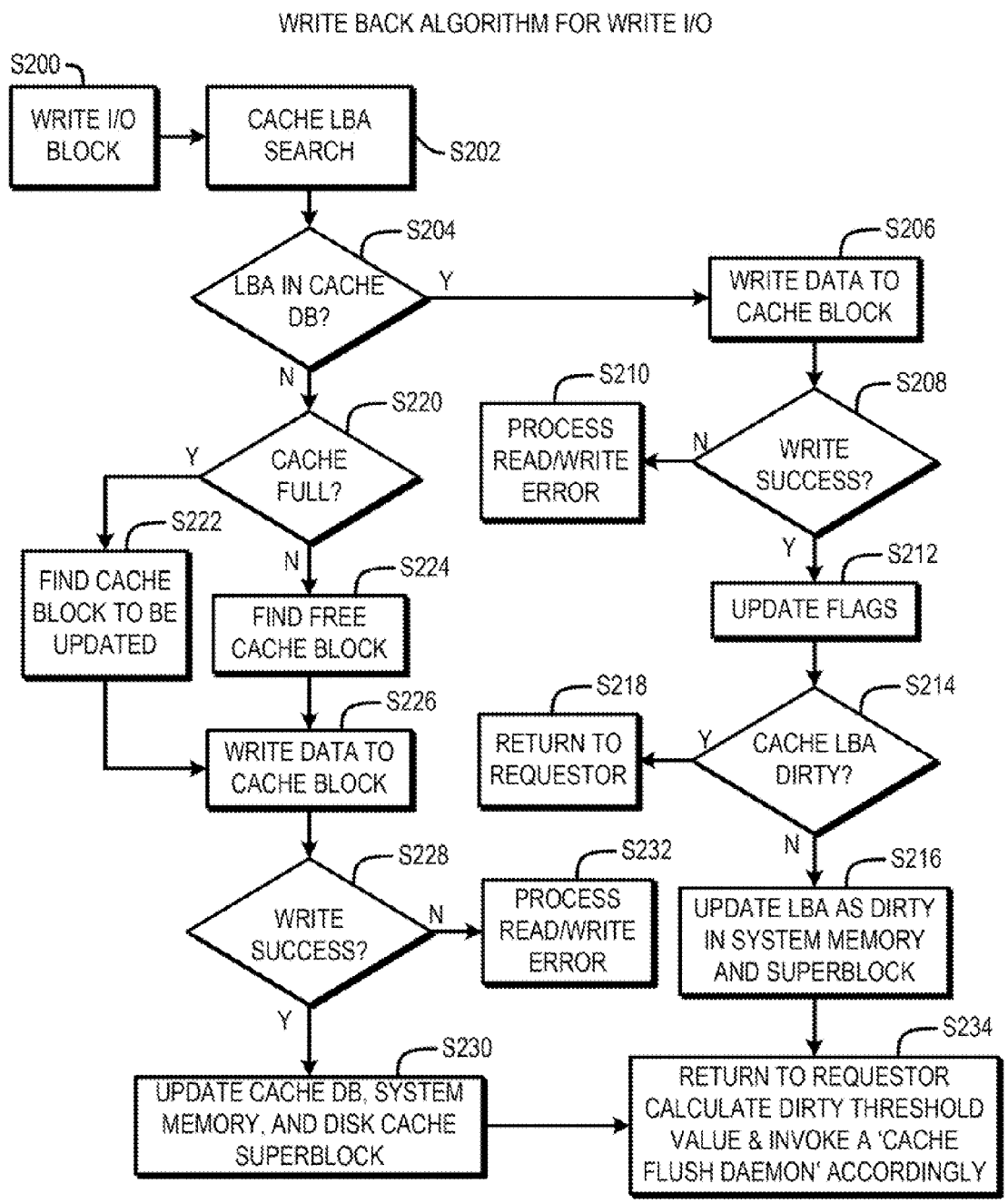
FIG. 8 is a flow diagram illustrating an example embodiment of a cache write algorithm that may utilize the techniques described herein.

FIG. 8 is a flow diagram illustrating an example embodiment of a cache write algorithm that may utilize the techniques described herein. The method begins at step S200 by writing I/O for a block. At Step S202, a cache logical block address (LBA) search is executed. If, at step S204, the LBA is found in the cache database, the method proceeds to step S206 where the method writes data to the cache block, and then proceeds to step S208 where a determination is made to see if the write was successful or not. If the write was not successful, the method proceeds to step S210 where the write error is processed. If the write was successful, the method proceeds to step S212 where flags are updated according to the replenish algorithm. At step S214, a check is made to see if the cache LBA is dirty, and if so, is returned to the requestor. If not, at step S216 the LBA is updated as dirty in system memory and in the on disk superblock data structure and then, at step S234, it returns to the requestor and a dirty threshold value is calculated and a 'cache flush daemon' is invoked accordingly.

However, if the LBA is not found in the cache database at step S204, the method proceeds to step S220 and a determination to see if the cache is full. If the cache is full, based on the cache replenish mechanism, the method locates the cache block to be updated with write I/O data and continues with step S226. If the cache is not full, at step S224, the method locates a free cache block to be updated with write I/O data. At step S226, the data is written to the identified cache block.

At step S228, if the write was not successful, the method proceeds to step S232 where the write error is processed. If the write was successful, the method proceeds to step S230 where various updates are performed including updating the cache search database with the new block, updating flags, and updating system memory and on disk cache superblock with the required information. The method then proceeds to step 234 where it returns to the requestor and a dirty threshold value is calculated and a 'cache flush daemon' is invoked accordingly.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Figure 9:
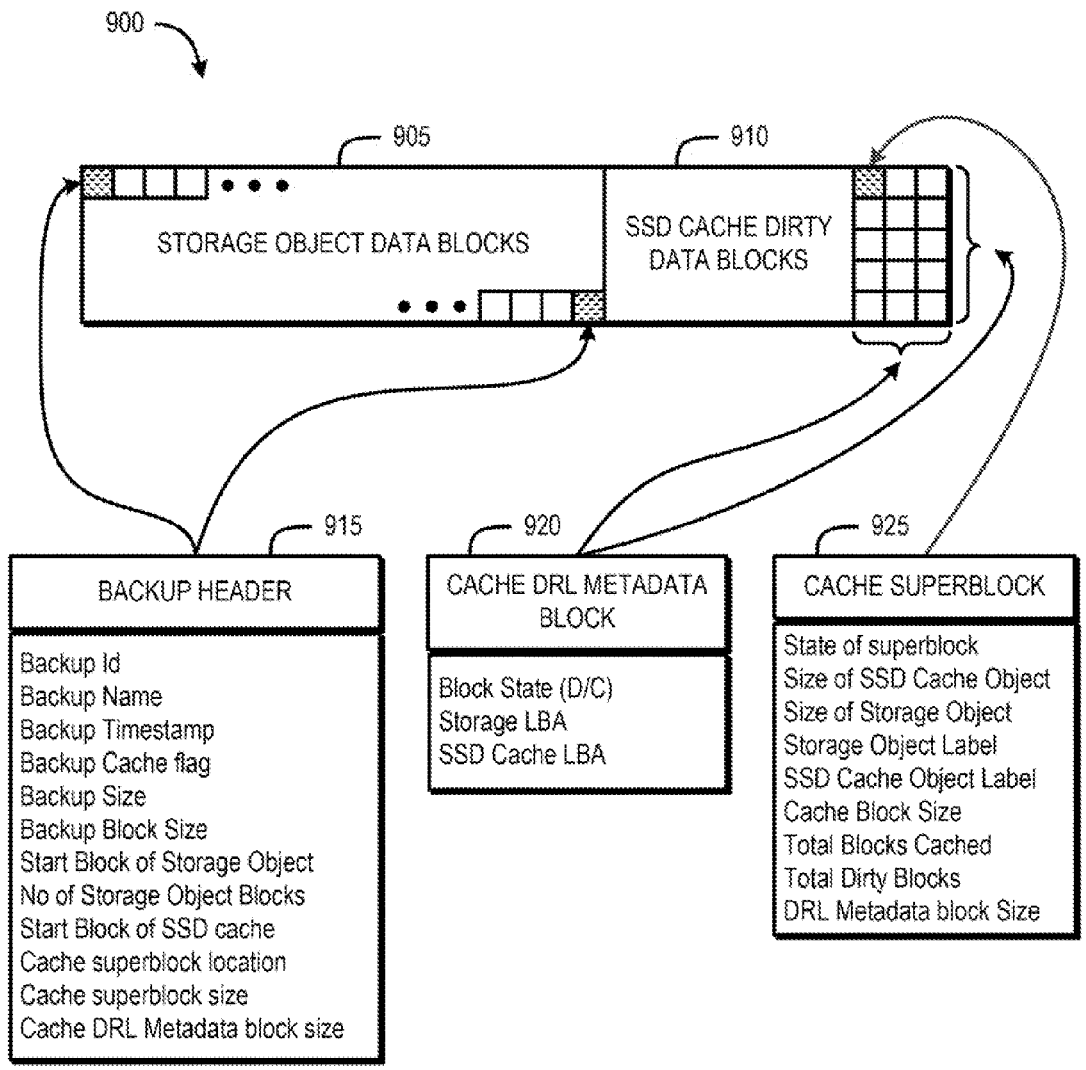
FIGS. 9-11 are block diagrams illustrating example embodiments of various backup image format that may utilize the techniques described herein.

FIG. 9 is a block diagram illustrating a backup image format that may be utilized in conjunction with the techniques described herein. The backup image 900 includes storage object data blocks 905, SSD cache dirty data blocks 910, backup header 915, DRL metadata blocks 920, and cache superblock 925. The backup header 915, DRL metadata block 920, and cache superblocks 925 include a number of fields (and are of sufficient size to hold respective fields) as shown in FIG. 9.

More detailed examples of backup algorithms, with reference to the general backup algorithm discussed above in FIG. 5 are presented below. The algorithm below (referred to herein as "backup method 1") uses the backup image format shown in FIG. 9 and proceeds as follows:

Step1: send a request to freeze I/O at cache module
Step2: take snapshot of storage object
Step3: take snapshot of SSD cache object
Setp4: unfreeze I/O at Cache module
Step5: calculate backup image size Backup Image Size=Sizeof(Storage Object)+(2*BackupHeaderSize)+Sizeof(SSD Dirty Blocks)+Sizeof(Superblock,DRL metadata blocks)

Step6: create a backup header with the information specified in the backup header 915 shown in FIG. 9
Step7: take a full backup of storage object data blocks from the storage object in the backup image starting from 2nd block (i.e., after the backup header start marker)
Step8: update the backup header with storage object and SSD cache object metadata information and write two copies of the backup header: one at the first location of the storage object data blocks and another at the end location of the storage object data blocks of the backup image (as shown FIG. 9)
Step9: read SSD cache superblock and DRL metadata information from the SSD cache object and read every SSD cache data block whose DRL state is dirty from the SSD cache object and write these blocks to a backup image location starting after the $2^{nd}$ backup header block
Step10: DRL metadata for all dirty/clean blocks of the SSD cache object may be written at the end of SSD cache dirty data blocks in backup image after the cache superblock (as shown in FIG. 9)

Figure 10:
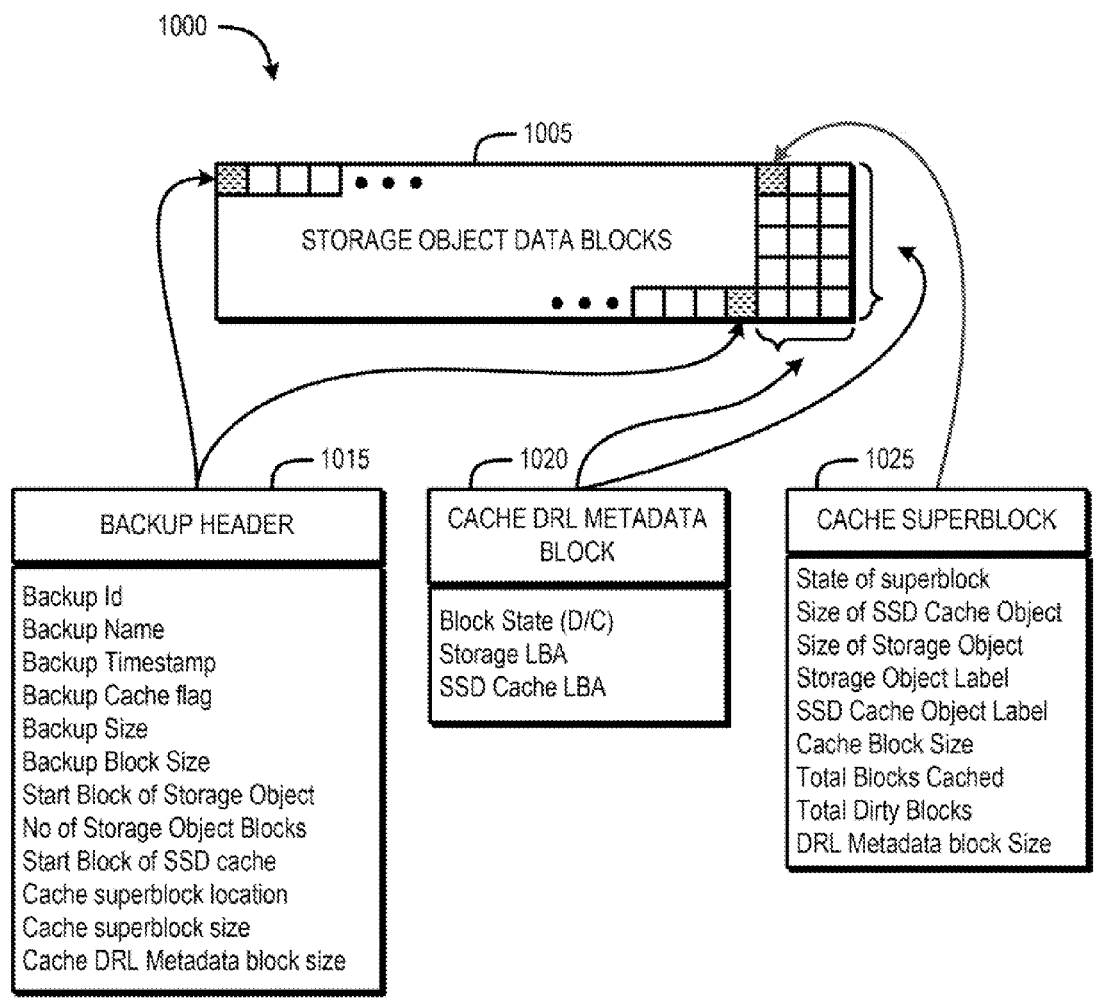

FIG. 10 is a block diagram illustrating an alternative example embodiment of a backup image format that may use considerably less storage space. The backup image 1000 includes storage object data blocks 1005, backup header 1015, DRL metadata blocks 1020, and cache superblock 1025. Note that the SSD cache dirty data blocks described the previous example is not needed when implementing this embodiment, resulting in a more space efficient algorithm. The backup header 1015, DRL metadata block 1020, and cache superblocks 1025 include a number of fields as shown in FIG. 10. The space efficient algorithm below (referred to herein as "backup method 2") uses the backup image format shown in FIG. 10:

Step1: send a request to freeze I/O operations at the cache module
Step2: take a snapshot of the storage object
Step3: take a snapshot of the SSD cache object
Setp4: unfreeze I/O operations at the cache module
Step5: calculate backup image size Backup Image Size=Sizeof(Storage Object)+(2*BackupHeaderSize)+Sizeof(Superblock,DRL metadata blocks)

Step6: create a backup header with the information specified in the backup header 915 shown in FIG. 9
Step7: take a full backup of storage object data blocks from the storage object in backup image starting from 2nd block Step 8: update the backup header with storage object and SSD cache object metadata information and write two copies of the backup header: one at the first location of the storage object data blocks and one at the end location of the storage object data blocks of the backup image (as shown FIG. 10

Step 9: read SSD cache superblock and DRL Metadata information from SSD cache object and read every SSD cache data block whose DRL state is dirty from SSD cache object and write these blocks to mapped storage object block locations at the backup image (advantageously, backup image size is reduced)

Step 10: write cache superblock and DRL metadata for all dirty/clean blocks of SSD cache data after the 2nd backup header block of backup image.

Two corresponding example restore algorithms, with reference to the general restore algorithm discussed above in FIG. 6 are presented below. The first restore algorithm (referred to herein as "restore method 1") may make utilize the backup image format shown in FIG. 9 and may be used in conjunction with backup method 1 described above. Restore method 1 proceeds as follows:

Step 1: read the backup header available at the first block of the backup image

Step 2: using the backup header metadata, create a restore storage object (RSO-N) of specified size, and begin reading storage object data blocks from a point in time backup image N and restore them to RSO-N Step 3: after completing the RSO-N restore, begin reading the cache superblock and DRL metadata information from the point in time backup image N and for every DRL dirty block, read the corresponding block available in the backup image and for every clean DRL meta block read data from RSO-N to create a restored SSD cache object (RSCO-N)

Step 4: after completing the SSD cache restore, create a cache map using the cache module Step 5: after successfully completing the cache map, enable application access to the restored storage object (i.e., RSO-N)

The second example restore algorithm (referred to herein as "restore method 2") may utilize the backup image format shown in FIG. 10 and may be used in conjunction with backup method 2 described above. Restore method 2 proceeds as follows:

Step 1: read the backup header available at the first block of the backup image

Step 2: using the backup header metadata, create a restore storage object (RSO-N) of specified size, and begin reading storage object data blocks from a point in time backup image N and restore them to RSO-N Step 3: after completing the RSO-N restore, begin reading the cache superblock and DRL metadata information from the point in time backup image N and for every DRL dirty block, read the corresponding block from RSO-N to create a restored SSD cache object (RSCO-N), since all dirty SSD cache blocks are written to storage object block locations of the backup image during backup method 2, and for every clean DRL meta block read data from RSO-N to create a restored SSD cache object (RSCO-N)

Step 4: after completion of SSD cache restore, create a cache map using the cache module Step 5: after successfully completing the cache map, enable application access to the restored storage object (i.e., RSO-N)

Figure 11:
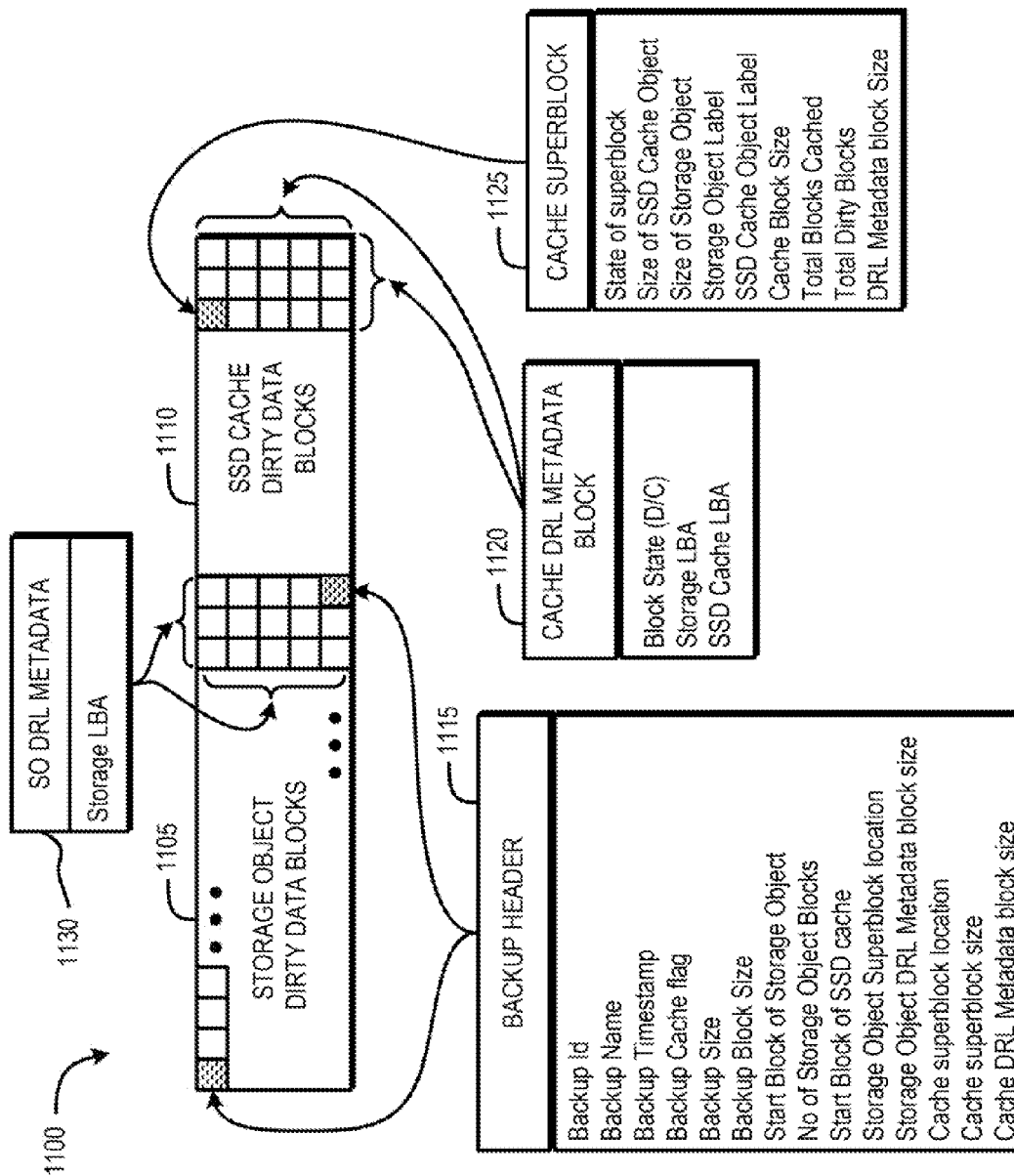

FIG. 11 is a block diagram illustrating an example embodiment of an incremental backup image format that may be utilized in conjunction with the techniques described herein. The backup image 1100 includes storage object data blocks 1105, SSD cache dirty data blocks 1110, backup header 1115, DRL metadata blocks 1120, cache superblock 1125, and storage object (SO) DRL metadata 1130. The backup header 1115, DRL metadata block 1120, and cache superblocks 1125 include a number of fields (and are of sufficient size to hold respective fields) as shown in FIG. 11.

In this embodiment, incremental backup is supported through the use of an in memory and on disk bitmap to track all write operations of the storage object at the cache module. The size of the bitmap maintained by the cache module may be as follows:

Bitmap size in bits=(size of storage object in bytes)/(block size of SSD cache object in bytes)

Bitmap size in bytes=(Bitmap size in bits)/8

Bitmap size in sectors=(Bitmap size in bytes)/512

The in memory and on disk (i.e., on cache/dedicated external volume) storage object DRL bitmap of above size is maintained and the same is mutually exclusive of the cache DRL bitmap. That is, bitmaps are maintained for both the disk and the cache.

The DRL bitmap tracks all writes going to the disk as well as the cache and are maintained in the cache module. These bitmaps are used when a backup is performed for the disk and cache. Thus, they are maintained by the cache module because the cache module is aware of all writes going to the disk and cache. Conventionally, only one bitmap (i.e., only metadata of dirty blocks in the superblock of storage object) is maintained as part of a standard backup procedure (i.e., not maintained by the cache module), and as a result, conventional methods cannot avail point in time SSD cache benefit to a restored storage object.

A full backup of a cache configured storage object may be performed using backup techniques such as those described in the related U.S. patent application Ser. No. 13/342,008 entitled "MANAGING CACHE BACKUP AND RESTORE." Consecutive incremental backups may follow the backup method described below.

More detailed examples of backup algorithms, with reference to the general backup algorithm discussed above in FIG. 5 are presented below. In one example embodiment, the algorithm below (referred to herein as "backup method 1") uses the backup image format shown in FIG. 11 and proceeds as follows:

Step 1: send a request to quiesce I/O at cache module

Step 2: take snapshot of storage object

Step 3: take snapshot of SSD cache object

Step 4: if the storage object superblock is maintained on cache go to Step 4, otherwise take a snapshot (SOS1) of the external volume that contains the storage object superblock and DRL information Step 5: a) Invalidate all dirty buffers in memory and on disk in order to collect the next set of storage object dirty buffers (i.e., new set of writes to storage object after previous full/incremental backup) for the next incremental backup of the storage object
b) unquiesce I/O at Cache module Step 6: calculate backup image size Backup Image Size=Sizeof(Storage Object dirty buffers)+(2*BackupHeaderSize)+Sizeof(SSD Dirty Blocks)+Sizeof(Superblock,DRL metadata blocks)+Sizeof(storage DRL)

Step 7: create a backup header with the information specified in the backup header 915 shown in FIG. 9

Step 8: determine backup type: if full backup, proceed to step 9 and skip steps 10-14; if incremental backup, skip step 9 and proceed to step 10.

Step 9: perform a full backup of storage object data blocks from the storage object in the backup image starting from 2nd block (i.e., after the backup header start marker)

Step 10: perform an incremental backup of storage object dirty data blocks from the storage object using the storage object DRL bit map to backup image starting from $2^{nd}$ block Step 11: update the backup header with storage object and SSD cache object metadata information and write two copies of the backup header: one at the first location of the storage object data blocks and another at the end location of the storage object data blocks of the backup image Step 12: write storage object superblock and DRL metadata for all dirty blocks of the storage object at the end of the storage object dirty data blocks at backup image Step 13: read SSD cache superblock and DRL metadata information from the SSD cache object and read every SSD cache data block whose DRL state is dirty from the SSD cache object and write these blocks to a backup image location starting after the $2^{nd}$ backup header block Step 14: write cache superblock and DRL metadata for all dirty/clean blocks of the SSD cache object at the end of the SSD cache dirty data blocks It should be noted that the backup header, cache superblock and DRL metadata blocks need not be written at the locations specified in above algorithm, and the locations that consume less seek time during the backup/restore can be standardized accordingly. The backup format shown in FIG. 9 is but one example embodiment that can be implemented to achieve the functionality described herein.

An alternative example embodiment employing the backup image depicted in FIG. 11 is described below. In this example, the algorithm illustrated may use considerably less storage space than backup method 1. As described above, the backup image 1100 of FIG. 11 includes storage object data blocks 1105, SSD cache dirty data blocks 1110, backup header 1115, DRL metadata blocks 1120, cache superblock 1125, and storage object (SO) DRL metadata 1130. The backup header 1115, DRL metadata block 1120, and cache superblocks 1125 include a number of fields (and are of sufficient size to hold respective fields). The space efficient algorithm below (referred to herein as "backup method 2") uses the backup image format shown in FIG. 11:

Step 1: send a request to quiesce I/O at cache module

Step 2: take snapshot of storage object

Step 3: take snapshot of SSD cache object

Step 4: if the storage object superblock is maintained on cache go to Step 4, otherwise take a snapshot (SOS1) of the external volume that contains the storage object superblock and DRL information Step 5: a) Invalidate all dirty buffers (i.e. new set of writes to storage object after previous full/incremental backup) in memory and on disk in order to collect the next set of storage object dirty buffers for the next incremental backup of the storage object b) unquiesce I/O at Cache module Step 6: calculate backup image size Backup Image Size=Sizeof(Storage Object dirty buffers)+(2*BackupHeaderSize)+Sizeof(SSD Dirty Blocks)+Sizeof(Superblock,DRL metadata blocks)+Sizeof(storage DRL)

Step 7: create a backup header with the information specified in the backup header 915 shown in FIG. 9

Step 8: determine backup type: if full backup, proceed to step 9 and skip steps 10-14; if incremental backup, skip step 9 and proceed to step 10.

Step 9: perform a full backup of storage object data blocks from the storage object in the backup image starting from 2nd block (i.e., after the backup header start marker)

Step 10: perform an incremental backup of storage object dirty data blocks from the storage object using the storage object DRL bit map in backup image starting from $2^{nd}$ block Step 11: update the backup header with storage object and SSD cache object metadata information and write two copies of the backup header: one at the first location of the storage object data blocks and another at the end location of the storage object data blocks of the backup image Step 12: write storage object superblock and DRL metadata for all dirty blocks of the storage object at the end of the storage object dirty data blocks Step 13: read SSD cache superblock and DRL metadata information from the SSD cache object and read every SSD cache data block whose DRL state is dirty from the SSD cache object then:
  a) find the matching storage object block that is written on the backup image
  b) if there is a matching storage object block written in the backup image, overwrite that block with dirty SSD cache block otherwise write this block in the backup image location after $2^{nd}$ backup header block Step 14: write cache superblock and DRL metadata for all dirty/clean blocks of SSD cache object at the end of SSD cache dirty data blocks backup image and update backup image cache DRL metadata state for each SSD cache dirty block overwritten on storage object space of the backup image A corresponding example restore algorithm, with reference to the general restore algorithm discussed above in FIG. 6 is presented below. The restore algorithm may utilize the backup image format shown in FIG. 11 and may be used in conjunction with backup method 1 and backup method 2 as described above. The restore algorithm proceeds as follows:

Step 1: read the backup header available at the first block of the backup image

Step 2: identify the latest full backup image and all incremental backup images after the latest full backup up to the recovery point backup version N
  a) restore the full backup image using restore methods described in related U.S. patent application Ser. No. 13/342,008 entitled "MANAGING CACHE BACKUP AND RESTORE") as a result this will create a restored storage object RSO-(N-x)
  b) use RSO-(N-x) as the latest restored storage object and follow below process for each incremental backup image identified up to the recovery point
    (i) read storage object DRL bitmap from backup image and use bitmap information to read all storage object data blocks from the backup image, write the data to latest restored storage object (ii) above step creates a latest restored storage object of point in time backup (iii) if the point in time backup image version matches the recovery point backup version N then halt this process, otherwise go to step (i)

c) as a result of Step 2(a) and 2(b), a point in time restored storage object RSO-N will be created Step 3: successful completion of restored storage object (RSO-N) will be followed by an SSD cache object restore operation and the same involves reading the cache superblock and cache DRL bitmap from the point in time backup image N and for every DRL dirty block, read corresponding block available in the backup image and for every clean DRL metadata block, read corresponding block from restored storage object (RSO-N); at the end of this process a consistent SSD cache object (RSCO-N) will be restored Step 4: after successful completion of storage object, and SSD cache restore, create a cache map between the storage object and the SSD cache using cache module Step 5: after successful completion of cache mapping operation, enable application access to the restored storage object (i.e., RSO-N)

The subject matter described herein for managing data backup and recovery in a data storage system may be implemented in hardware, software, firmware, or any combination thereof. As such, the terms "technique" or "logic" as used herein may refer to software in combination with hardware and/or firmware for implementing the feature being described. In one example implementation, the subject matter described herein may be implemented using a non-transitory computer readable medium having stored thereon computer executable instructions that when executed by the processor of a computer perform steps.

Exemplary non-transitory computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method, comprising:
quiescing I/O operations at a cache;
taking a first snapshot of a storage object and a second snapshot of a cache object;
unquiescing I/O operations at the cache;
creating, at least one backup image comprising the first snapshot and the second snapshot; and
storing the backup image;
wherein creating the backup image comprises:
calculating a backup image size;
writing, to the backup image, a backup storage object data blocks from the storage object;
updating the backup header with storage object metadata and cache object metadata;
writing the backup header to the backup image;
reading, from the cache object, cache superblock and dirty region logging (DRL) metadata and reading, from the cache object, cache data blocks determined to have a DRL state that is dirty; and
writing, to the backup image, the cache superblock and dirty region logging (DRL) metadata and the cache data blocks determined to have a DRL state that is dirty.

2. The method of claim 1, further comprising:
reading data from the backup image; and
restoring the cache object from the backup image at least in part by loading the cache object with data present in the cache object when the backup image was created.

3. The method of claim 1, wherein creating the backup image further comprises:
performing a dump of metadata of clean blocks of the cache.

4. The method of claim 1, wherein the method comprises:
creating the backup image within a threshold time of unquiescing I/O operations at the cache.

5. A system, comprising:
a processor; and
storage accessible to the processor and bearing instructions executable by the processor to:
quiesce I/O operations at a cache;
take a first snapshot of at least a portion of data in storage and a second snapshot of at least a portion of data in the cache;
unquiesce I/O operations at the cache;
create, within a threshold time of unquiescing I/O operations at the cache, at least one backup image comprising the first snapshot and the second snapshot; and
store the backup image;
wherein creation of the backup image comprises:
writing, to the backup image, a backup of at least one storage data block from the storage;
including, in a backup header, storage metadata;
writing, to the backup image, the backup header;
reading, from the cache, at least one cache data block determined to have a dirty region logging (DRL) start that is dirty; and
writing, to the backup image, the at least one cache data block determined to have a DRL state that is dirty.

6. The system of claim 5, wherein the instructions are executable to:
read data from the backup image; and
restore the portion of data from the cache from the backup image at least in part by loading the cache with data resent in the cache when the backup image was created.

7. The system of claim 5, wherein creation of the backup image further comprises:
creating the backup header.

8. The system of claim 5, wherein creation of the backup image further comprises:
including, in the backup header, cache metadata.

9. The system of claim 5, wherein creation of the backup image further comprises:
calculating a backup image size for the backup image.

10. The system of claim 5, wherein creation of the backup image further comprises:
reading cache superblock and DRL metadata from the cache; and
writing, to the backup image, the cache superblock and DRL metadata.

11. The system of claim 5, wherein creation of the backup image further comprises:
performing a dump of metadata of clean blocks of the cache.

12. The system of claim 5, wherein creation of the backup image further comprises:
   writing DRL metadata for at least one block of the cache to the end of the cache data blocks in the backup image.

13. The system of claim 5, wherein creation of the backup image further comprises:
   writing a copy of the header to the storage.

14. The system of claim 5, wherein creation of the backup image further comprises:
   determining a backup type for creating the backup image;
   in response to determining that an incremental backup is the backup type, writing to the backup image a backup of at least one dirty storage data block from the storage using a storage DRL bitmap; and
   in response to determining that a full backup is the backup type, writing to the backup image a full backup of at least one storage data block from the storage.

15. The system of claim 5, wherein creation of the backup image further comprises:
   writing, to the backup image, the at least one cache data block determined to have a DRL state that is dirty by overwriting at least one respectively matching storage block in the backup image with the at least one cache data block determined to have a DRL state that is dirty.

16. A computer readable storage medium that is not a transitory signal, the computer readable storage medium comprising instructions executable by a processor to:
   quiesce I/O operations at a cache;
   take a first snapshot of at least a portion of a storage area and a second snapshot of at least a portion of the cache;
   unquiesce I/O operations at the cache;
   create, within a threshold time of unquiescing I/O operations at the cache, at least one backup image comprising the first snapshot and the second snapshot; and
   store the backup image;
   wherein creation of the backup image comprises:
   writing, to the backup image, a backup of at least one storage data block from the storage area;
   including, in a backup header, storage area metadata;
   writing, in the backup image, the backup header;
   reading, from the cache, at least one cache data block determined to have a dirty region logging (DRL) state that is dirty; and
   writing, to the backup image, the at least one cache data block determined to have a DRL state that is dirty.

17. The computer readable storage medium of claim 16, wherein creation of the backup image further comprises:
   writing a copy of the header to the storage area.

18. The computer readable storage medium of claim 16, wherein the instructions are executable to:
   read data from the backup image; and
   restore the portion of the cache from the backup image at least in part by loading the cache with data present in the cache when the backup image was created.

19. The computer readable storage medium of claim 16, wherein creation of the backup image further comprises:
   determining a backup type for creating the backup image;
   in response to determining that an incremental backup is the backup type, writing to the backup image a backup of at least one dirty storage data block from the storage area using a storage area DRL bitmap; and
   in response to determining that a full backup is the backup type, writing to the backup image a full backup of at least one storage data block from the storage area.

20. The computer readable storage medium of claim 16, wherein creation of the backup image further comprises:
   writing, to the backup image, the at least one cache data block determined to have a DRL state that is dirty by overwriting at least one respectively matching storage block in the backup image with the at least one cache data block determined to have a DRL state that is dirty.

* * * * *